United States Patent [19]

Miyaji et al.

[11] Patent Number: 4,585,134

[45] Date of Patent: Apr. 29, 1986

[54] PORTABLE CONTAINER

[75] Inventors: Kenichi Miyaji; Shouji Toida; Seiichi Ito; Isao Watanabe, all of Yoshidamachi, Japan

[73] Assignee: Nippon Sanso Kabushiki Kaisha, Tokyo, Japan

[21] Appl. No.: 681,115

[22] Filed: Dec. 12, 1984

[30] Foreign Application Priority Data

Dec. 21, 1983 [JP] Japan .............. 58-196862[U]

[51] Int. Cl.[4] .............................................. B65D 23/10
[52] U.S. Cl. ...................... 215/100 A; 190/115; 220/94 R
[58] Field of Search .......... 220/94 R; 190/115; 215/100 A

[56] References Cited

U.S. PATENT DOCUMENTS

| 3,000,536 | 9/1961 | Roy ......................... 220/94 R |
| 3,034,617 | 5/1962 | Gehrie . |
| 3,275,336 | 9/1966 | Warner, Jr. .................. 190/115 |
| 3,289,799 | 12/1966 | Bush ........................ 190/115 |
| 3,297,120 | 1/1907 | Bush ........................ 190/115 |
| 3,340,970 | 9/1967 | Szabo ....................... 190/115 |
| 3,340,971 | 9/1967 | Szabo ....................... 190/115 |
| 3,359,946 | 12/1907 | Schluttig ................... 220/94 R |
| 4,516,687 | 5/1985 | Taguchi et al. ............ 215/100 A |

FOREIGN PATENT DOCUMENTS 833233 4/1960 United Kingdom .
1114486 5/1968 United Kingdom .

Primary Examiner—Joseph Man-Fu Moy
Attorney, Agent, or Firm—McAulay, Fields, Fisher, Goldstein & Nissen

[57] ABSTRACT

A portable container includes a body and a collapsible handgrip mounted on a peripheral side wall of the body. The handgrip includes a link pivotally mounted on the side wall of the body at one end thereof, an elongated guide member pivotally mounted on the side wall at one end thereof, and an elongated slide member hingedly connected to the other end of the link at one end thereof and engaging the guide member for sliding movement therealong. The handgrip is movable between a contracted position wherein the hinged ends of the link and the slide member are disposed adjacent to the side wall of the body and an expanded position wherein the hinged ends are spaced away from the side wall.

20 Claims, 6 Drawing Figures

FIG. 1
FIG. 2
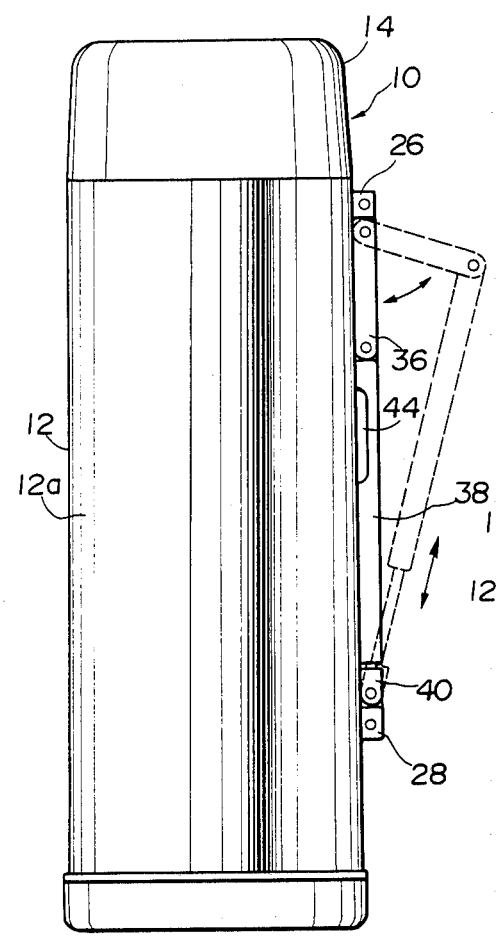
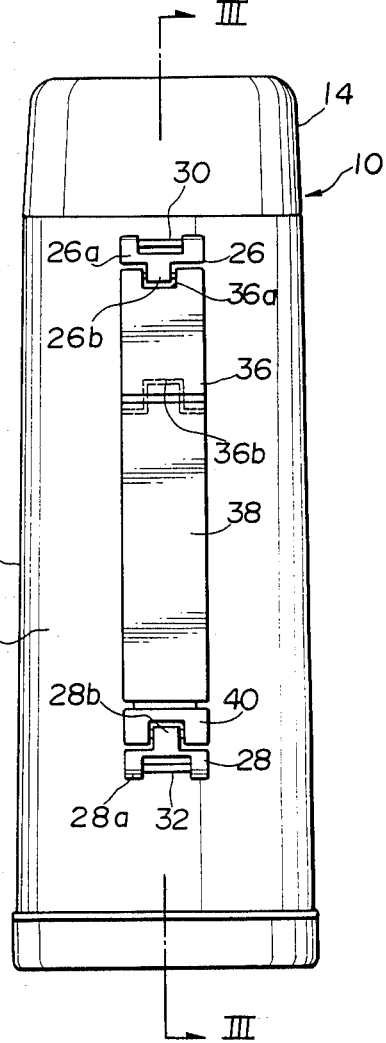

PORTABLE CONTAINER

BACKGROUND OF THE INVENTION

1. Field of the Invention

This invention relates to a portable container such as a portable vacuum bottle and particularly to an improvement in a handgrip of the container.

2. Prior Art

A conventional thermos or vacuum bottle of a relatively compact size is provided with either a fixed handgrip or strap. The vacuum bottle with the fixed handgrip is advantageous in that the contents of the bottle can be easily poured into a cup or the like by grasping the handgrip. However, when one must carry such a vacuum bottle with him, for example, in a bag or the like, it is rather bulky and consumes space since it has the handgrip projecting outwardly from a bottle body. On the other hand, the conventional vacuum bottle with the strap is advantageous in that it is convenient to carry. However, such a vacuum bottle is less handy because when pouring the contents of the bottle, one must hold it with both hands since it has no handgrip.

SUMMARY OF THE INVENTION

It is therefore an object of this invention to provide a portable container having a collapsible handgrip which can be held flat against a body of the container so that it can be carried in a bag or the like without the need for an undue space.

According to the present invention, there is provided a portable container which comprises a body having a peripheral side wall; and a collapsible handgrip mounted on the outer surface of the side wall, the handgrip comprising a link pivotally mounted on the side wall at one end thereof, and an elongated guide member pivotally mounted on the side wall at one end thereof disposed at a level below the one end of the link, and an elongated slide member hingedly connected to the other end of the link at one end thereof and engaging the guide member for sliding movement therealong; whereby said handgrip is movable between a contracted position wherein the hinged ends of said link and said slide member are disposed adjacent to said side wall of said body and an expanded position wherein said hinged ends are spaced away from said side wall of the body.

BRIEF DESCRIPTION OF THE DRAWINGS

FIG. 1 a side elevational view of a portable vacuum bottle provided in accordance with the present invention;

FIG. 2 is a front elevational view of the vacuum bottle;

DESCRIPTION OF THE PREFERRED EMBODIMENT OF THE INVENTION

Figure 3:
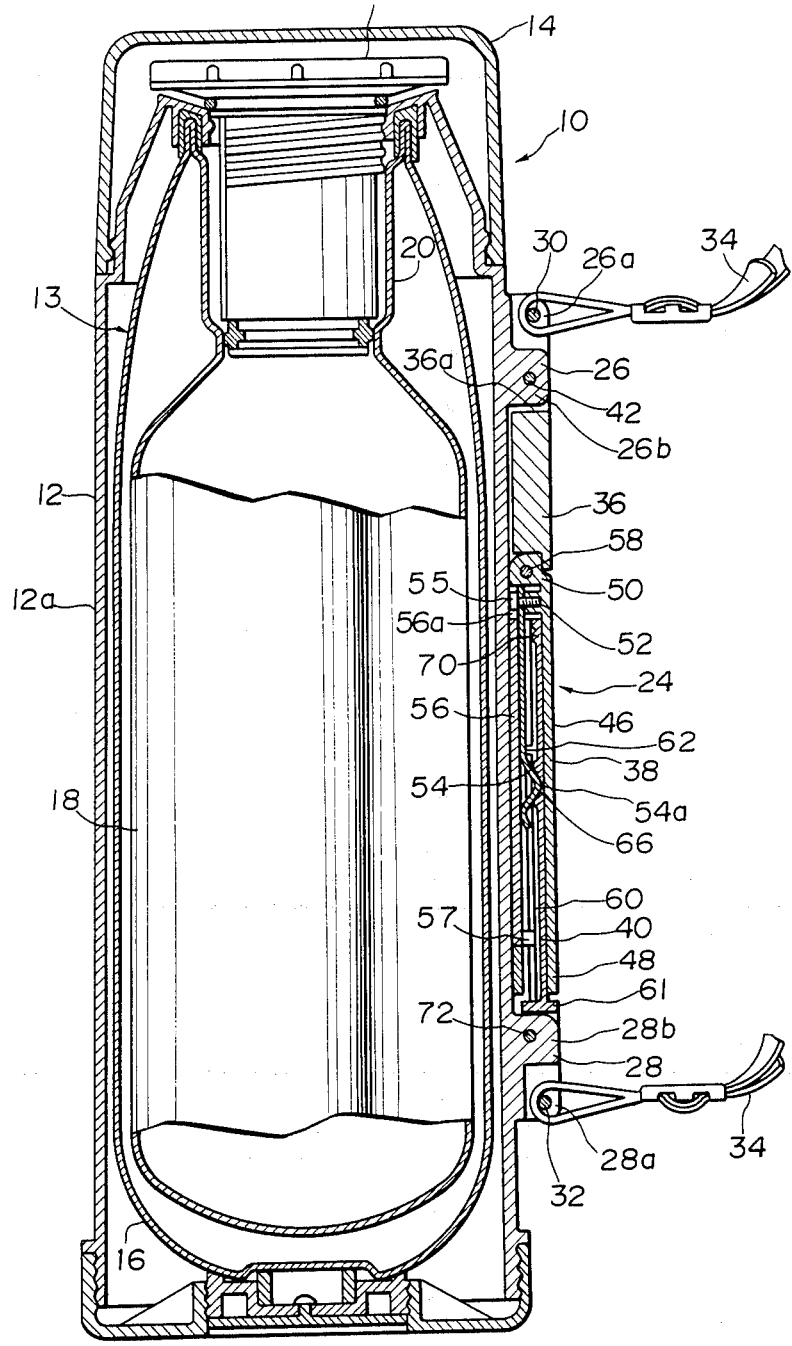
FIG. 3 is a cross-sectional view of the vacuum bottle taken along the line III—III of FIG. 2, showing a handgrip in its inoperative position.

Like reference numerals denote corresponding parts in several views.

Figure 4:
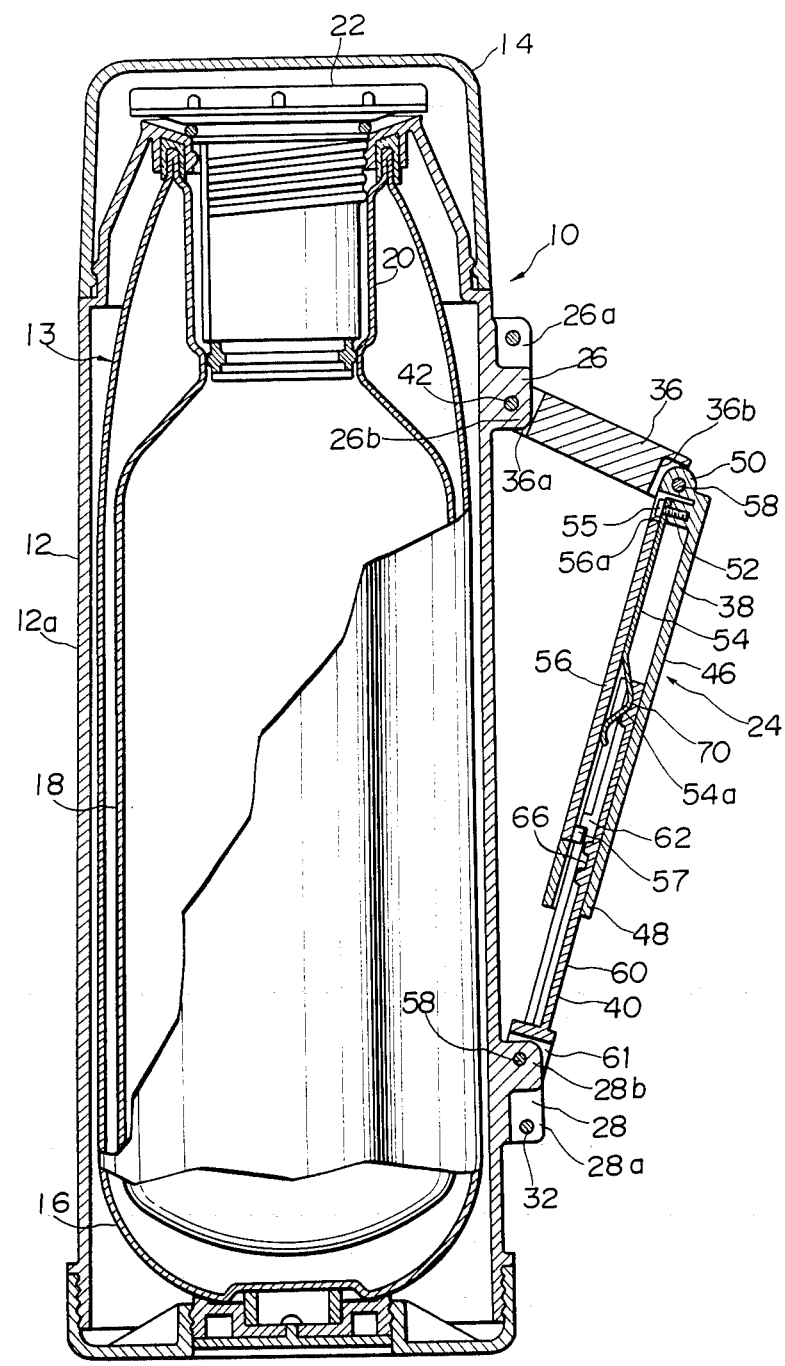
FIG. 4 is a cross-sectional view of the vacuum bottle, showing the handgrip in its operative position.

FIGS. 1 and 2 schematically shows a portable container or vacuum bottle 10 which comprises a cylindrical casing or body 12 and a container assembly 13 mounted within the casing 12 as best shown in FIGS. 3 and 4. A cap 14 is detachably fitted on the upper end portion of the casing 12. The bottle assembly 13 comprises an outer metallic shell 16 and an inner metallic shell 18 disposed within the outer shell 16 coaxially therewith and spaced therefrom to form therebetween a thermal insulation space which is evacuated. The inner shell 18 for holding beverage or the like is reduced in diameter at its upper portion to provide a mouth 20. A plug 22 is adapted to be threadedly received in the mouth 20.

A collapsible handgrip 24 is attached to a peripheral side wall 12a of the casing 12, the handgrip 24 being disposed longitudinally along the axis of the cylindrical casing 12. The casing 12 has a pair of upper and lower lugs 26 and 28 formed on the outer surface of the side wall 12a of the casing 12 for mounting the handgrip 24 on the casing 12, the upper and lower lugs 26 and 28 being spaced from each other along the length of the casing 12. The upper and lower lugs 26 and 28 have U-shaped portions 26a and 28a, respectively, and handgrip-mounting portions 26b and 28b of a rectangular shape extending from the respective U-shaped portions 26a and 28a and directed toward each other. A pair of pins 30 and 32 are mounted on the U-shaped portions 26a and 28a, respectively, and opposite ends of a strap 34 are attached to the pins 30 and 32, respectively. The handgrip 24 comprises a link 36 pivotally connected to the upper lug 26 at one end thereof, an elongated slide member 38 of a hollow construction hingedly connected to the other end of the link 36 at one end thereof, and an elongated guide member 40 pivotally connected to the lower lug 28 at one end thereof and received in the slide member 38 coaxially therewith so that the slide member 38 is slidable relative to the guide member 40 along an axis thereof.

Figure 5:
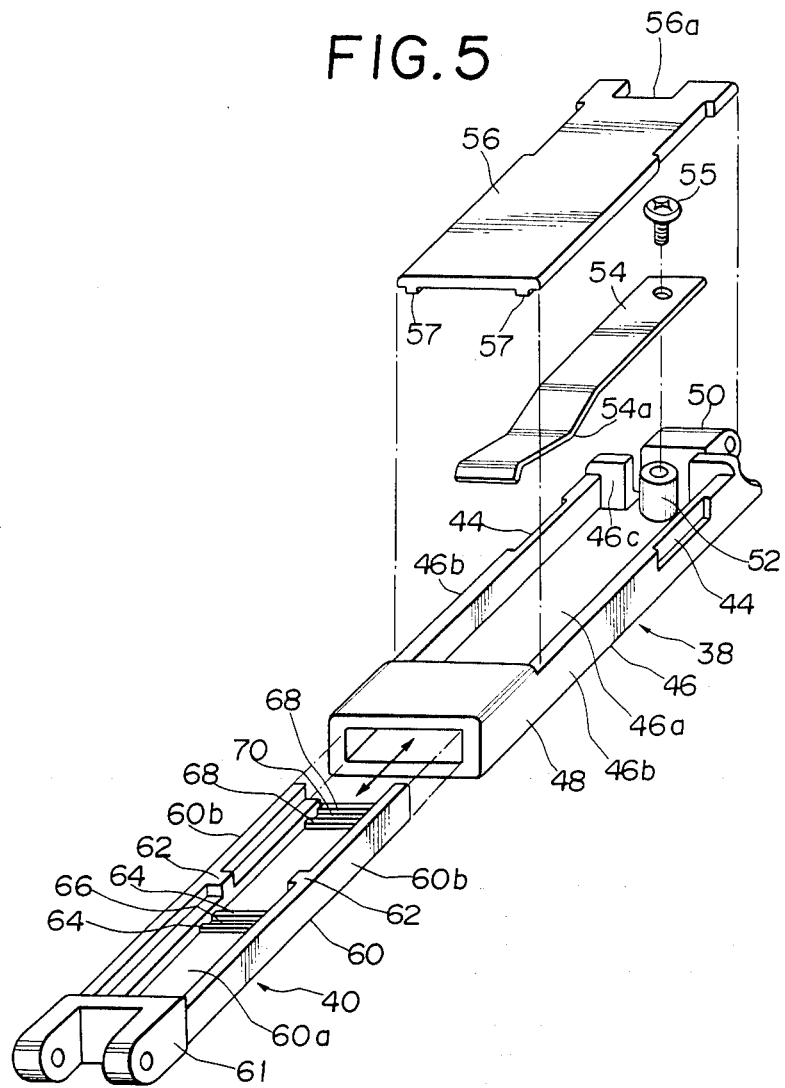
FIG. 5 is an exploded perspective view of a major portion of the handgrip.

More specifically, the one end of the link 36 is bifurcated to provide a recess 36a in which the handgrip-mounting portions 26b is received, and the link 36 is pivotally connected to the mounting portions 26b by a pin 42 passing through the mated bifurcated end and mounting portion 26b. As best shown in FIG. 5, the slide member 38 includes a generally channel-shaped portion 46 defined by a base 46a and a pair of parallel spaced arms 46b and 46b interconnected by the base 46a at their one ends, a hollow portion 48 of a rectangular shape extending from one end of the channel-shaped portion 46 along an axis thereof, and a lug 50 formed on the other end of the channel-shaped portion 46. A boss 52 having a threaded hole is formed on the base 46a adjacent to the lug 50. The channel-shaped portion 46 has an end wall 46c at the other end thereof. A leaf spring 54 is secured at one end to the boss 52 by a screw 55 threaded therethrough into the threaded hole, the leaf spring 54 extending along the axis of the channel-shaped portion 46 of the slide member 38. The leaf spring 54 has an engaging portion 54a of V-shape at the other end thereof. A cover plate 56 of a generally rectangular shape is removably attached to the ends or edges of the pair of arms 46b of the channel-shaped portion 46 with the opposite ends thereof disposed in snapping engagement with the end wall 46c and the hollow portion 48, so that the cover plate 56 cooperates with the channel-shaped portion 46 to form a hollow structure of a rectangular cross-section. The outer surface of the cover plate 56 lies flush with the outer surface of the hollow portion 48 facing away from the base 46a. The cover plate 56 has a notch 56a formed in one end thereof and has a pair of stop projections 57 formed on the inner surface adjacent to the other end thereof. The head of the screw 55 extends into the notch 56a. The leaf spring 54 is held against the inner surface of the cover plate 56, and the V-shaped engaging portion 54a is directed toward the base 46a. A pair of recesses 44 and 44 are formed in the outer surfaces of the arms 46b and 46b adjacent to the end wall 46c for facilitating the pulling the slide member 38 with the fingers.

The other end of the link 36 is bifurcated to provide a recess 36b in which the lug 50 of the slide member 38 is received, and the link 36 and the slide member 38 are hingedly connected together by a pin 58 passing through the mated bifurcated end and lug 50.

As best shown in FIG. 5, the guide member 40 includes a generally trough-shaped portion 60 defined by a base 60a and a pair of parallel opposed arms 60b and 60b interconnected by the base 60a at their one ends, and a U-shaped portion 61 formed on the one end thereof. The pair of arms 60b and 60b are stepped at their opposed inner surfaces, respectively, and a pair of opposed abutment projections 62 and 62 of a square shape are formed on the respective stepped portions and disposed intermediate the opposite ends of the trough-shaped portion 60. A pair of transverse ridges 64 and 64 are formed on the base 60a intermediate the opposite ends thereof and disposed in parallel closely spaced relation to each other to form a first retaining groove 66. Also another pair of transverse ridges 68 and 68 are formed on the base 60a adjacent to the end of the guide member 40 remote from the U-shaped portion 61 and disposed in parallel closely spaced relation to each other to form a second retaining groove 70. The U-shaped portion 61 of the guide member 40 is fitted on the handgrip-mounting portion 28b of the lower lug 28 and is pivotally connected thereto by a pin 72.

The trough-shaped portion 60 of the guide member 40 is received in the slide member 38 of a hollow construction so that the slide member 38 is slidingly movable along the guide member 40. The pair of stop projections 57 and 57 of the cover plate 56 are engageable with the respective abutment projections 62 to prevent the slide member 38 from becoming disengaged from the guide member 40. The V-shaped engaging portion 54a of the leaf spring 54 is received and retained in the first retaining groove 66 when the handgrip 24 is in its inoperative or contracted position (FIG. 3) wherein the link 36 and the slide member 38 are laid flat against the outer surface of the side wall 12a of the casing 12, with the trough-shaped portion 60 of the guide member 40 almost fully received in the hollow slide member 38. Also, the V-shaped engaging portion 54a is received and retained in the second retaining groove 70 when the handgrip 24 is in its operative or expanded position (FIG. 4) wherein the hinged ends of the link 36 and the slide member 38 are spaced away from the side wall 12a of the casing 12. In the expanded position of the handgrip 24, the pair of stop projections 57 and 57 of the cover plate 56 are held in engagement with the respective abutment projections 62.

When it is desired to grasp the handgrip 24, that is to say, to bring the handgrip 24 from its contracted to expanded position, the recesses 44 and 44 of the slide member 38 are held by the fingers, and then the slide member 38 is pulled away from the side wall 12a of the casing 12 so that the link 36 is angularly moved counterclockwise (FIG. 4) about the pin 42 while the guide member 40 is angularly moved clockwise about the pin 58. Upon angular movement of the link 36 and the guide member 40, the slide member 38 slidingly moves relative to the guide member 40 along the axis thereof away therefrom with the V-shaped engaging portion 54a becoming disengaged from the first retaining groove 66, so that the V-shaped engaging portion 54a of the leaf spring 54 is brought into engagement with the second retaining groove 70 to retain the handgrip 24 in its operative or expanded position under the influence of the resilient force thereof, with the stop projections 57 of the cover plate 56 held in engagement with the abutment projections 62. In this condition, the handgrip 24 assumes a generally inverted L-shape. Then, the handgrip 24 is grasped by the hand and the liquid or the like contained in the bottle assembly 14 can be poured in a stable manner by tilting the vacuum bottle 10.

When the handgrip 24 is to be brought from the expanded position to the contracted position, the handgrip 24 is urged toward the side wall 12a of the casing 12 by a force sufficient to bring the V-shaped engaging portion 54a of the leaf spring 54 out of engagement with the second retaining groove 70, so that the link 36 and the guide member 40 are angularly moved toward the side wall 12a of the casing 12. Upon angular movement of the link 36 and the guide member 40, the slide member 38 slidingly moves relative to the guide member 40 along the axis thereof toward it so that the link 36 and the slide member 38 are laid flat against the side wall of the casing 12, with the V-shaped engaging portion 54a of the leaf spring 54 engaged in the first retaining groove 66 to retain the handgrip 24 in its contracted position under the influence of the resilient force thereof. In this contracted position, the link 36, the slide member 38 and the guide member 40 are disposed along a common axis which is along the axis of the casing 12 of the vacuum bottle 10.

Thus, the handgrip 24 is disposed flat against the side wall 12a of the casing 12 in its contracted position, the handgrip 24 will not consume an undue space when the vacuum bottle 10 is to be carried in a bag or the like. In addition, the handgrip 24 can be easily brought from its contracted to expanded position and vice versa. Further, the upper and lower lugs 26 and 28 serve to mount both the handgrip 24 and the strap 34, and therefore there is no need to provide separate strap-mounting projections on the outer surface of the casing 12.

Figure 6:
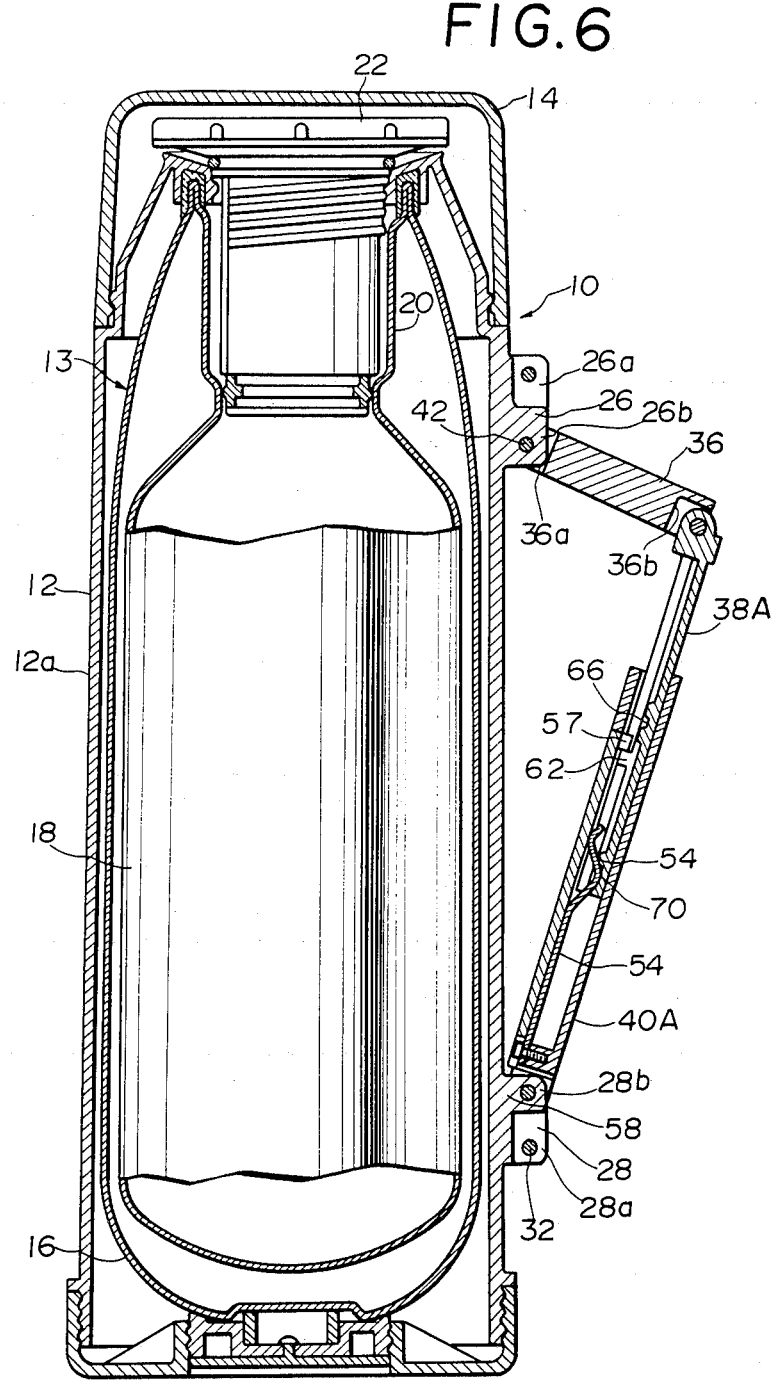
FIG. 6 is a view similar to FIG. 4 but showing a modified vacuum bottle.

According to a modified form of the invention shown in FIG. 6, a slide member 38A takes the form similar to the guide member 40, and a guide member 40A takes the form similar to the slide member 38.

What is claimed is:

1. A portable container comprising:
    (a) a body having a peripheral side wall; and
    (b) a collapsible handgrip mounted on the outer surface of said side wall, said handgrip comprising a link pivotally mounted on said side wall at one end thereof, and an elongated guide member pivotally mounted on said side wall at one end thereof disposed at a level below said one end of said link, and an elongated slide member hingedly connected to the other end of said link at one end thereof and engaging said guide member for sliding movement therealong;

one of said slide member and said guide member having engaging means, the other having a pair of first and second retaining means spaced along the length thereof, said engaging means being engageable with said first retaining means when said handgrip is in its contracted position, thereby holding said slide member against movement relative to said guide member, said engaging means being engageable with said second retaining means when said handgrip is in its expanded position, thereby holding said slide member against movement relative to said guide member;

said engaging means being resiliently engageable with said first and said second retaining means; and said handgrip being moveable between a contracted position wherein the hinged ends of said link and said guide member are disposed adjacent to said side wall of said body and an expanded position wherein said hinged ends are spaced away from said side wall.

2. A portable container according to claim 1, in which one of said slide member and said guide member is of a hollow construction and receives the other therein.

3. A portable container according to claim 1, in which said first and second retaining means comprises a pair of grooves disposed transversely of one of said slide member and said guide member and spaced along the length thereof, said engaging means comprising a leaf spring having a V-shaped engaging portion which is engageable with said pair of grooves.

4. A portable container according to claim 1, in which one of said slide member and said guide member has stop means, and the other having abutment means engageable with said stop means when said handgrip is in its expanded position, thereby preventing a further sliding movement of said slide member relative to said guide member in a direction away therefrom.

5. A portable container according to claim 1, in which said container comprises a vacuum bottle having a bottle assembly mounted within said body, said bottle assembly including a pair of inner and outer metallic shells disposed coaxially with each other and spaced from each other to form therebetween a thermal insulation space which is evacuated.

6. A portable container according to claim 3, in which said leaf spring has one end secured to said guide member and its other end extending along the axis of a channel-shaped portion forming a base for said slide member.

7. A portable container comprising:
(a) a body having a peripheral side wall; and
(b) a collapsible handgrip mounted on the outer surface of said side wall, said handgrip comprising a single link pivotally mounted on said side wall at one end thereof, and another member pivotally connected with the other end thereof consisting essentially of a single elongated guide member and a single elongated slide member, one of said slide member and said guide member being pivotally connected with said single link and the other of said slide member and said guide member being pivotally connected with said side wall and being mounted on said side wall at one end thereof disposed at a level below said one end of said link, said single elongated slide member being complementary to said single elongated guide member and together with said guide member being hingedly connected to the other end of said link at one end thereof and engaging said guide member for sliding movement therealong; and said handgrip being movable between a contracted position wherein the hinged ends of said link and said other member are disposed adjacent to said side wall of said body and an expanded position wherein said hinged ends are spaced away from said side wall and form a substantially inverted L-shaped handle with the long leg of said L-shaped handle providing the portion of hand contact of said handle.

8. A portable container according to claim 7, in which one of said slide member and said guide member is of a hollow construction and receives the other therein.

9. A portable container according to claim 7, in which one of said slide member and said guide member has stop means, and the other having abutment means engageable with said stop means when said handgrip is in its expanded position, thereby preventing a further sliding movement of said slide member relative to said guide member in a direction away therefrom.

10. A portable container according to claim 7, in which said container comprises a vacuum bottle having a bottle assembly mounted within said body, said bottle assembly including a pair of inner and outer metallic shells disposed coaxially with each other and spaced from each other to form therebetween a thermal insulation space which is evacuated.

11. A portable container according to claim 7, in which solely the other end of said link and said guide member are slidably connected together for movement relative to each other from said contracted position to said expanded position.

12. A portable container according to claim 7, wherein said guide member includes first and second telescoping members movable telescopically relative to each other and being axially aligned for all positions of said first and second telescoping members.

13. A portable container according to claim 7, wherein said link member includes first and second members movable from a first position in which said members are axially aligned to a second position in which said first and second members are substantially orthogonally related.

14. A portable container according to claim 13, including means pivotally connecting said first and said second members for permitting pivotal movement thereof from said first position to said second position.

15. A portable container according to claim 7, in which said slide member includes a generally channel-shaped portion having a base and a pair of parallel spaced arms and a hollow rectangularly-shaped portion extending from one end of said channel-shaped portion along an axis thereof, and a leaf spring having one end secured to the other end of said channel-shaped portion and its other end extending along the axis of said channel-shaped portion.

16. A portable container according to claim 15, including a cover plate for said channel-shaped portion, said cover plate having a notch formed in one end thereof and a pair of stop projections formed on the inner surface adjacent to the other end thereof, said leaf spring being held against the inner surface of said cover plate.

17. A portable container according to claim 15, wherein said parallel spaced arms are provided with recesses for facilitating pulling of said slide member.

18. A portable container according to claim 7, in which one of said slide member and said guide member has engaging means, the other having a pair of first and second retaining means spaced along the length thereof, said engaging means being engageable with said first retaining means when said handgrip is in its contracted position, thereby holding said slide member against movement relative said guide member, and said engaging means being engageable with said second retaining means when said handgrip is in its expanded position, thereby holding said slide member against movement relative to said guide member.

19. A portable container according to claim 18, in which said engaging means is resiliently engageable with said first and second retaining means.

20. A portable container according to claim 19, in which said first and second retaining means comprise a pair of grooves disposed transversely of one of said slide member and said guide member and spaced along the length thereof, said engaging means comprising a leaf spring having a V-shaped engaging portion which is engageable with said pair of grooves.

* * * * *